United States Patent
Yepez et al.

(10) Patent No.: US 9,071,473 B2
(45) Date of Patent: Jun. 30, 2015

(54) METHOD AND SYSTEM FOR WIRELESS COMMUNICATION CHANNEL ESTIMATION

(75) Inventors: Eliana Yepez, Ottawa (CA); Jinliang Huang, Stockholm (SE); Edward Mah, Kanata (CA); Fredrik Huss, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 964 days.

(21) Appl. No.: 13/229,164

(22) Filed: Sep. 9, 2011

(65) Prior Publication Data

US 2013/0065537 A1    Mar. 14, 2013

(51) Int. Cl.
*H04B 17/00* (2015.01)
*H04L 25/02* (2006.01)
*H04L 27/26* (2006.01)

(52) U.S. Cl.
CPC ........ *H04L 25/0222* (2013.01); *H04L 25/0224* (2013.01); *H04L 27/2602* (2013.01)

(58) Field of Classification Search
CPC ................................................ H04L 25/0222
USPC ............... 455/67.11, 67.13, 69, 522; 370/252
See application file for complete search history.

(56) References Cited

U.S. PATENT DOCUMENTS

| | | | |
|---|---|---|---|
| 7,433,433 B2 * | 10/2008 | Wilhelmsson et al. | 375/350 |
| 7,804,889 B2 | 9/2010 | Yim et al. | |
| 7,949,061 B2 | 5/2011 | Tong et al. | |
| 2002/0119796 A1 * | 8/2002 | Vanghi | 455/522 |
| 2004/0248541 A1 | 12/2004 | Park | |
| 2006/0045194 A1 | 3/2006 | Athanasios et al. | |
| 2006/0269016 A1 | 11/2006 | Long et al. | |
| 2008/0049814 A1 | 2/2008 | Jeon | |
| 2008/0075182 A1 | 3/2008 | Hsieh et al. | |
| 2008/0123758 A1 | 5/2008 | Paik et al. | |
| 2008/0219360 A1 | 9/2008 | Hekmann et al. | |
| 2008/0219371 A1 | 9/2008 | Hong et al. | |
| 2009/0274200 A1 | 11/2009 | Ikram et al. | |
| 2010/0040154 A1 | 2/2010 | Carbonelli et al. | |
| 2010/0074346 A1 | 3/2010 | Thompson et al. | |
| 2010/0136919 A1 | 6/2010 | Sathananthan et al. | |
| 2010/0290570 A1 | 11/2010 | Sathananthan et al. | |
| 2011/0078178 A1 | 3/2011 | Ehben | |
| 2011/0122789 A1 * | 5/2011 | Haustein et al. | 370/252 |

FOREIGN PATENT DOCUMENTS

WO       2011007258 A2      1/2001

OTHER PUBLICATIONS

PCT Invitation to Pay Additional Fees, Form PCT/ISA/206, for corresponding International Application No. PCT/IB2012/053363; International Filing Date: Jul. 2, 2012 consisting of 7-pages.

\* cited by examiner

*Primary Examiner* — Hsin-Chun Liao
(74) *Attorney, Agent, or Firm* — Christopher & Weisberg, P.A.

(57) ABSTRACT

A method and system for selecting an algorithm for channel estimation in a wireless communication system are disclosed. According a parameter indicative of an accuracy of a channel estimation algorithm is determined. A selection between a first channel estimation algorithm and a second channel estimation algorithm is made based on the determined parameter.

14 Claims, 5 Drawing Sheets

METHOD AND SYSTEM FOR WIRELESS COMMUNICATION CHANNEL ESTIMATION

FIELD

The present invention relates to a method and system for channel estimation in a wireless communication system, and more particularly to dynamic selection of a channel estimation algorithm.

BACKGROUND

Channel estimation in a wireless communication system is needed for coherent demodulation at a receiver, and is also used in multi-antenna systems to increase throughput or coverage using knowledge of the transmitter and/or receiver. Channel estimation is affected by the channel conditions such as signal to interference plus noise ratio (SINR), mobile velocity, and multi-path delay spread.

Typically, channel estimation involves estimating the channel between a transmitter and a receiver based on known pilot symbols. The pilot symbols are transmitted periodically, for example, once per time slot, for each carrier frequency. To estimate the channel for data received between pilot symbols, an interpolation method is used. There exist several interpolation algorithms that may be employed for channel estimation. Of these, first order interpolation algorithms are of particular interest because of their low complexity.

First order interpolation algorithms include, without limitation, averaging algorithms, linear interpolation algorithms, minimum mean square error (MMSE) algorithms, and nearest neighbor algorithms. Of these methods, the MMSE algorithm exhibits the best performance over different channel conditions such as low and high Doppler conditions, different delay spreads, as well as different SINR levels. However, the MMSE algorithm assumes knowledge of the Doppler frequency, which may not be available or easily obtainable.

The averaging algorithm is a good alternative for low Doppler channels, i.e., Doppler channels where the mobile device is traveling at a low speed, as well as for channels with a low SINR, but performance of the averaging algorithm decreases significantly for high Doppler channels. i.e., Doppler channels where the mobile device is traveling at a high speed. The linear interpolation algorithm performs well in high Doppler channels, but is not good for low SINR channels and low Doppler channels. The nearest neighbor algorithm exhibits performance that is between the performance of the linear interpolation algorithms and the performance of the averaging algorithms.

Therefore, what is needed is a channel estimation method that performs well under various channel conditions such as low and high Doppler, low and high SINR, and different delay spreads.

SUMMARY

The present invention advantageously provides a method and system for selecting an algorithm for channel estimation in a wireless communication system. According to one aspect, the invention provides a method that includes calculating a parameter indicative of an accuracy of a channel estimation algorithm. The method further includes selecting between a first channel estimation algorithm and a second channel estimation algorithm based on the parameter.

According to another aspect, the invention provides a computer readable medium containing computer readable instructions that, when executed by a processor, cause the processor to perform functions that include calculating a parameter indicative of an accuracy of a channel estimation algorithm for estimating a channel in a communication system. The functions also include selecting a channel estimation algorithm to estimate a channel based on the parameter.

According to another aspect, the invention provides a communication device that performs a channel estimate based on an algorithm. The device includes a memory and a processor. The memory stores at least one parameter indicative of an accuracy of a channel estimation algorithm for channel estimation. The processor calculates the at least one parameter, and selects a channel estimation algorithm based on the at least one parameter.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present invention, it is noted that the embodiments reside primarily in combinations of apparatus components and processing steps related to channel estimation in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
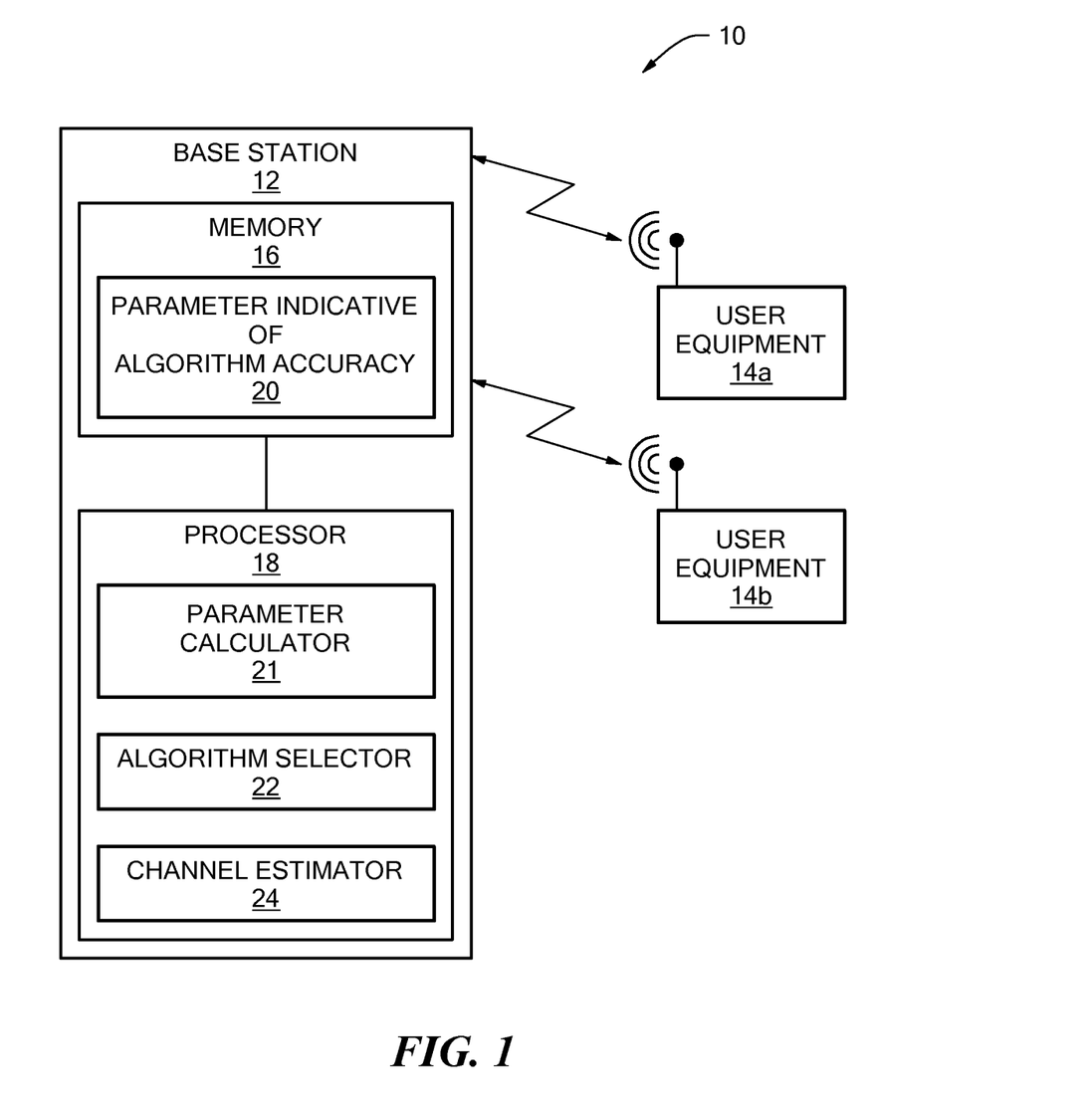
FIG. 1 is a block diagram of an exemplary wireless communication system built in accordance with the principles of the present invention.

Referring now to the drawing figures, in which like reference designators denote like elements, there is shown in FIG. 1 a block diagram of an exemplary wireless communication system built in accordance with the principles of the present invention, the system generally denoted as "10." System 10 includes at least one base station 12 and a plurality of user equipment 14a and 14b, referred to collectively herein as user equipment 14. User equipment 14 may include mobile telephones, personal digital assistants, laptop computers and other portable or fixed equipment. The base station 12 and the user equipment 14 may communicate using a variety of encoding and modulation techniques. In one embodiment, an Orthogonal Frequency Division Multiplex (OFDM) access method may be employed.

The base station 12 includes a memory 16 and a processor 18. The memory 16 stores programmatic code to be executed by the processor 18, and also stores at least one parameter 20 indicative of accuracy of a channel estimation algorithm. The processor 18 performs various functions associated with establishing and maintaining wireless communication with the user equipment 14. The functions include parameter calculator 21, algorithm selector 22 and channel estimation 24.

The parameter calculator 21 performs calculation of a parameter indicative of accuracy of a channel estimation algorithm. In one embodiment, the parameter indicative of accuracy of a channel estimation algorithm may be based on a temporal variation of a wireless channel. The algorithm selector 22 selects an algorithm for channel estimation based on the calculated parameter. For example, if the temporal variation of the channel is low, a first channel estimation algorithm with good performance in channels with low temporal variation may be selected. Conversely, if the temporal variation of the channel is high, a second channel estimation algorithm with good performance in channels with high temporal variation may be selected. The channel is estimated using the selected channel estimation algorithm.

In another embodiment, the parameter indicative of accuracy of a channel estimation algorithm may be based on a first error associated with a first algorithm and a second error associated with a second algorithm. For example, the first error may be a mean square error of a first algorithm and the second error may be a mean square error of a second algorithm. The algorithm selected by the algorithm selection function 22 may be the algorithm with the least mean square error associated therewith. The channel is then estimated using the selected channel estimation algorithm.

Thus, in one embodiment, a parameter is calculated that is based at least in part on temporal variation of the channel to be estimated. In another embodiment, a parameter is calculated that is based at least in part on a difference between error functions associated with each of a plurality of channel estimation algorithms. Selection of an algorithm to estimate the channel may be based on a comparison of the parameter to a threshold. The threshold may be based on a probability function.

A method of calculating a parameter indicative of an accuracy of a channel estimation algorithm based on temporal variation of the channel is explained below.
For illustration purposes, the following example and explanation is based on a two-antenna receiver and a one-antenna transmitter. Let $n \in \{1, \ldots, n_1, \ldots, n_2, \ldots, N\}$ be the OFDM symbol index, where $n_1, n_2$, are the indices for the pilots of slot one and slot two respectively (i.e., pilot indices in one subframe). Also, let $f \in \{1, \ldots, F\}$ be the subcarrier index. The coefficients of the frequency response of the $(2 \times 1)$ system at the $n^{th}$ OFDM symbol, with the $(2F \times 1)$ vector are defined as:

$$H(n) = \begin{bmatrix} H^{11}(n) \\ H^{21}(n) \end{bmatrix}$$

where $H^{11}(n), H^{21}(n)$, are $(F \times 1)$ vectors of the channel frequency response coefficients from receive antenna one and two respectively. Also, let $Z(n)$ be the $(2F \times 1)$ noise vector at the OFDM symbol$^n$, which is complex Gaussian-distributed according to $CN(0, \sigma_Z^2 I_{2F \times 2F})$. Then the estimate of the channel frequency response on the $n^{th}$ OFDM symbol as the $(2F \times 1)$ vector is:

$$\tilde{H}(n) = H(n) + Z(n)$$

or equivalently, $$\begin{bmatrix} \tilde{H}_1^{11}(n) \\ \vdots \\ \tilde{H}_F^{21}(n) \end{bmatrix} = \begin{bmatrix} H_1^{11}(n) \\ \vdots \\ H_F^{21}(n) \end{bmatrix} + Z(n)$$

where $H_f^{ij}(n)$ and $\tilde{H}_f^{ij}(n)$ ($i \in [1,2]$ and $j=1$), are the coefficients of the channel frequency response, and its estimate, respectively, for the $n^{th}$ OFDM symbol, from the $i^{th}$ receive antenna and $j^{th}$ transmit antenna, at the $f^{th}$ subcarrier. Assuming that the channel coefficients from different transmit-receive antenna pairs are uncorrelated to each other, the power can be written as $E\{|H_f^{ij}(n)|^2\} = P$, where P is the transmitted power and the average is taken over all the symbols n.

Having estimated the channel based on the known pilot symbols, a statistical parameter, $\theta_n$ (stored as parameter 20), may be calculated from the channel estimate that is indicative of a temporal variation of a channel. Consequently, the statistical parameter $\theta_n$ is indicative of an accuracy of a channel estimation algorithm for interpolating the channel response during data transmission between reference symbols (pilot symbols). The statistical parameter $\theta_n$ may be calculated and compared to a threshold every sub-frame to determine which of a group of two or more channel estimation algorithms will most accurately estimate the channel. Thus, $\theta_n$ estimates the temporal variation in the channel from one pilot symbol to the next pilot symbol in a given sub-frame.

In some embodiments, the statistical parameter $\theta_n$ may be calculated by:

$$\theta = \frac{1}{2N_T N_R F} \sum_{j=1}^{N_T} \sum_{i=1}^{N_R} \sum_{f=1}^{F} \left( \text{Re}(\tilde{H}_f^{ij}(n_1)) - \text{Re}(\tilde{H}_f^{ij}(n_2)) \right)^2 + \left( \text{Im}(\tilde{H}_f^{ij}(n_1)) - \text{Im}(\tilde{H}_f^{ij}(n_2)) \right)^2$$

where $N_T$ is a number of transmit antennas, $N_R$ is a number of receive antennas, and F is a number of sub carriers. Thus, the statistical parameter may be based on the squares of the differences between channel estimates based on known pilot symbols. Note that another way to measure temporal variation using the parameter $\phi$ is given by:

$$\phi = \frac{1}{2N_T N_R} \sum_{j=1}^{N_T} \sum_{i=1}^{N_R} \left( \frac{1}{F} \sum_{f=1}^{F} \text{Re}(\tilde{H}_f^{ij}(n_1)) - \frac{1}{F} \sum_{f=1}^{F} \text{Re}(\tilde{H}_f^{ij}(n_2)) \right)^2 + \left( \frac{1}{F} \sum_{f=1}^{F} \text{Im}(\tilde{H}_f^{ij}(n_1)) - \frac{1}{F} \sum_{f=1}^{F} \text{Im}(\tilde{H}_f^{ij}(n_2)) \right)^2$$

The value $\theta$ may be normalized by the received power as follows:

$$\theta_n = \frac{\theta}{\tilde{P}_r}$$

Where $\tilde{P}_r = P + \eta$ is the estimated received power which is equal to the transmit power P, plus the noise power $\eta$ channel estimation. The normalized statistic, $\theta_n$, is then independent of the channel normalization procedure used.

As noted above, $\theta_n$ may be compared to a threshold. If $\theta_n$ exceeds a threshold, indicating a fast time-varying channel, a first channel estimation algorithm, such as a linear interpolation algorithm, may be selected to estimate the channel. If $\theta_n$ does not exceed the threshold, indicating a slow time-varying channel, a second channel estimation algorithm, such as an averaging algorithm, may be selected to estimate the channel.

Figure 2:
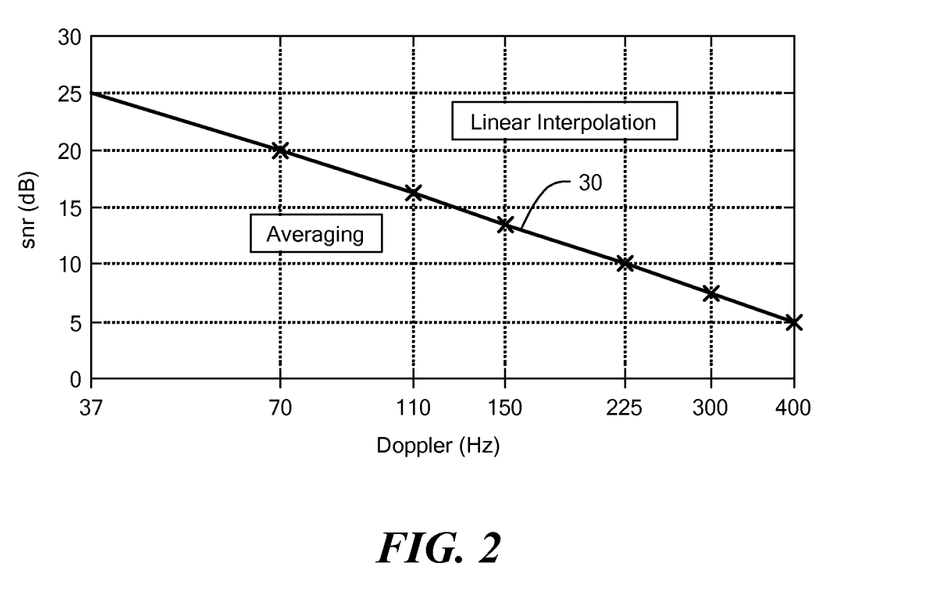
FIG. 2 is a graph of a signal to noise ratio versus Doppler frequency.

FIG. 2 is a graph 30 showing how the switch point depends on signal to noise ratio versus Doppler frequency. Note that a linear relationship may exist between signal to noise ratio (SNR) and Doppler frequency. In particular, as Doppler frequency increases, SNR decreases. For a given Doppler frequency, when the SNR is high, it may be desirable to use a linear interpolation algorithm to estimate the channel. Conversely, for a given Doppler frequency, when the SNR is low, it may be desirable to use an averaging algorithm to estimate the channel. In one embodiment, the threshold to which $\theta_n$ is compared is chosen to favor selection of the averaging algorithm due to the large penalty in terms of estimation error when mistakenly choosing linear interpolation as opposed to the averaging algorithm.

Figure 3:
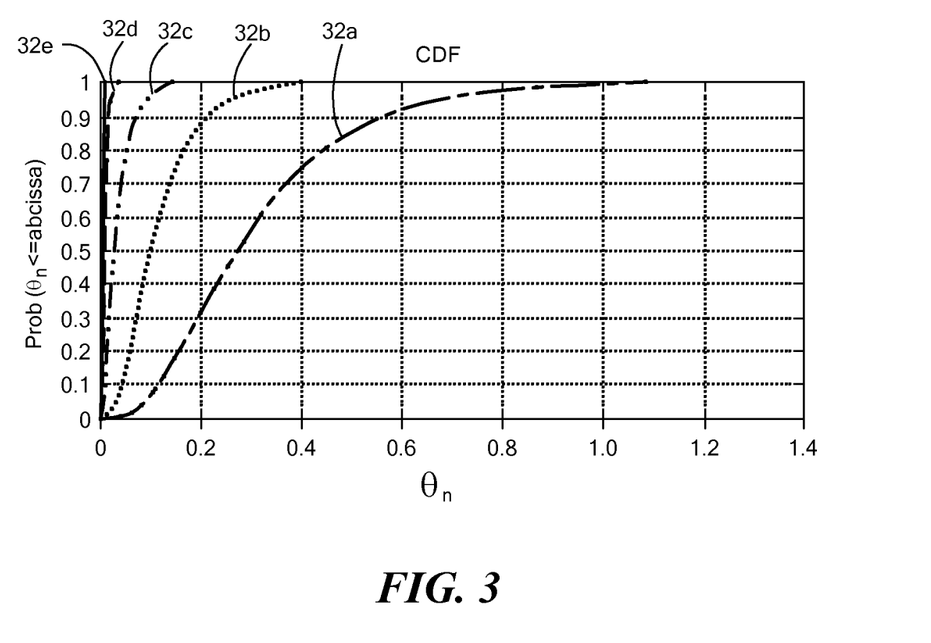
FIG. 3 is a graph of several cumulative distribution functions.

FIG. 3 is a graph of several cumulative distribution functions (CDFs) used to determine a threshold $\Theta$ to which the calculated parameter $\theta_n$ is compared. Each curve shows the distribution of $\theta_n$, which is calculated based on a limited number of samples. Moreover, each curve specifies a given channel condition (i.e., Doppler and SINR level) based on FIG. 2 but where the SNR level is backed off by 5 dB to ensure that for that channel condition, an averaging algorithm should be selected. To set the threshold $\Theta$ then, a high probability value for $\theta_n$ is set (i.e., 99%) which corresponds to a threshold $\Theta$=0.9 in the case of a Doppler of 225 Hertz with SINR=5 dB (see curve 32a in FIG. 3). Therefore, if the calculated $\theta_n \leq \Theta$ then the channel is considered to have a Doppler frequency less than or equal to 225 Hz and an averaging algorithm is selected. On the other hand, if the calculated $\theta_n > \Theta$ then the channel is considered to have a Doppler frequency higher than 225 Hz and a linear interpolation algorithm is selected. The rest of curves in FIG. 3 are described as follows. The curve 32b is a CDF for a Doppler frequency of 125 Hz and a SNR of 10 dB. The curve 32c is a CDF for a Doppler frequency of 70 Hz and a SNR of 15 dB. The curve 32d is a CDF for a Doppler frequency of 37 Hz and a SNR of 20 dB. The curve 32e is a CDF for a Doppler frequency of 5 Hz and a SNR of 25 dB. A similar process to the one described above may be performed for other Doppler frequency-SNR ratio combinations resulting in the following table.

| SNR (dB) | SNR range (dB) | CDF point chosen | $\Theta$ |
|---|---|---|---|
| 5 | (2.5, 7.5) | $P_{ETU225}(\theta \leq \Theta) = 0.99$ | 0.9 |
| 10 | (7.5, 12.5) | $P_{ETU125}(\theta \leq \Theta) = 0.99$ | 0.38 |
| 15 | (12.5, 17.5) | $P_{EVA70}(\theta \leq \Theta) = 0.99$ | 0.095 |
| 20 | (17.5, 22.5) | $P_{EVA37}(\theta \leq \Theta) = 0.99$ | 0.038 |
| 25 | (22.5, —) | $P_{EPA5}(\theta \leq \Theta) = 0.99$ | 0.009 |

An alternative and simplified method to determining a threshold $\Theta$ from the cumulative distribution function (CDF) curves of FIG. 3 is as follows. Note from the table that at high percentage values (p>90%), the following relationship between $\Theta$ and the SNR holds:

$$\Theta(p) = \frac{\tilde{\Theta}(p)}{S\tilde{N}R_{lin}}$$

Where $$S\tilde{N}R_{lin} = \frac{P}{\eta}$$

corresponds to the estimated SNR of a channel estimator in linear scale, $\eta$ is the estimated noise level after channel estimation, and $\tilde{\Theta}(p)$ represents a nominal threshold value at percentage point p and at SNR=0 dB. As a result, it is no longer necessary to calculate different threshold values $\Theta(p)$ from the CDF curves shown in FIG. 3. Instead the nominal threshold value $\tilde{\Theta}(p)$ is calculated and then divided by the estimated SNR level to obtain $\Theta(p)$. Furthermore, the nominal threshold value at any percentage point p can be approximated by the following fourth degree polynomial expression.

$$\tilde{\Theta}(p) \approx -2.3339p^4 + 8.0448p^3 - 10.8173p^2 + 6.8343p - 0.7244$$

This expression is accurate for values of $p \in [50, 100]\%$.

Thus, in one embodiment, a statistical parameter $\theta_n$ indicative of a temporal variation of the channel between successive pilot symbols may be computed and compared to a threshold value $\Theta$. The threshold may be approximated by a polynomial function and may also be based on a signal to noise ratio measured after channel estimation.

When the statistical parameter $\theta_n$ is greater than the threshold $\Theta$, a linear interpolation algorithm, or another channel estimation algorithm that exhibits good performance for fast temporal variations of the channel, may be selected to estimate the channel. Conversely, when the statistical parameter $\theta_n$ is less than the threshold $\Theta$, an averaging algorithm, or another channel estimation algorithm that exhibits good performance for slow temporal variations of the channel, may be selected to estimate the channel.

An alternative to using the statistical parameter $\theta_n$ and the threshold $\Theta$ as a basis for selecting a channel estimation algorithm, one may use mean square errors of multiple algorithms as a basis for choosing a channel estimation algorithm. For example, the mean square error of an averaging algorithm, $MSE_{avg}$ and the mean square error of a linear interpolation algorithm $MSE_{lin}$, may be computed to determine which algorithm is better i.e., the algorithm with the lowest mean square error. In other words, the processor 18 may compute as follows.

$$MSE_\Delta = MSE_{avg} - MSE_{linear}$$

where $$MSE_{avg} = \sum_{n=1, n \neq n_1, n_2}^{N} E\{|\Delta_a(n)|^2\}$$

And N is the number of symbols per sub-frame, and $$E\{|\Delta_a(n)|^2\} = \frac{3P}{2}J_0(0) + \frac{P}{2}J_0(\omega_0(n_2 - n_1)) - PJ_0(\omega_0(n_1 - n)) - PJ_0(\omega_0(n_2 - n)) + \frac{\sigma_z^2}{2}$$

$$MSE_{linear} = \sum_{n=1, n \neq n_1, n_2}^{N} E\{|\Delta_l(n)|^2\}$$

where $$E\{|\Delta_l(n)|^2\} = 2P\left[\left(\frac{n-n_1}{n_2-n_1}\right)^2 - \frac{n-n_1}{n_2-n_1}\right]\left[J_0(0) - J_0(\omega_0(n_2-n_1)) + \frac{\sigma_z^2}{P}\right] + 2PJ_0(0) +$$

-continued $$\sigma_z^2 - 2P\frac{n-n_1}{n_2-n_1}[J_0(\omega_0(n_2-n))-J_0(\omega_0(n_1-n))]-2PJ_0(\omega_0(n_1-n))$$

where P is transmit signal power, $J_0(7\omega_0)$ is a zero-order Bessel function of the first kind and $\omega_0=2\pi f_D T_s$, $f_D$ is the Doppler frequency, and $T_s$ is the OFDM symbol interval. $\sigma_Z^2$ is the estimation noise variance. By appropriate substitution of these expressions it can be shown that $$MSE_\Delta = MSE_{avg} - MSE_{linear} \approx 8P(1-J_0(7\omega_0)) - 8.28\sigma_z^2$$

where $1-J_0(7\omega_0)$ can be derived from θ from the following equation:

$$\theta = 2\gamma(1-J_0(7\omega_0)) + 2\sigma_z^2$$

Therefore, $$MSE_\Delta \approx 4\theta - 16.28\sigma_z^2$$

Then $MSE_\Delta$ can be compared to a threshold, which can be derived as described above with respect to Θ.

Thus, in one embodiment, a mean square error function that is a difference between a mean square error of a first channel estimation algorithm and the mean square error of a second channel estimation algorithm may be computed. The mean square error function can then be compared to a threshold to determine which of the first and second channel estimation algorithms to select to estimate the channel.

Figure 4:
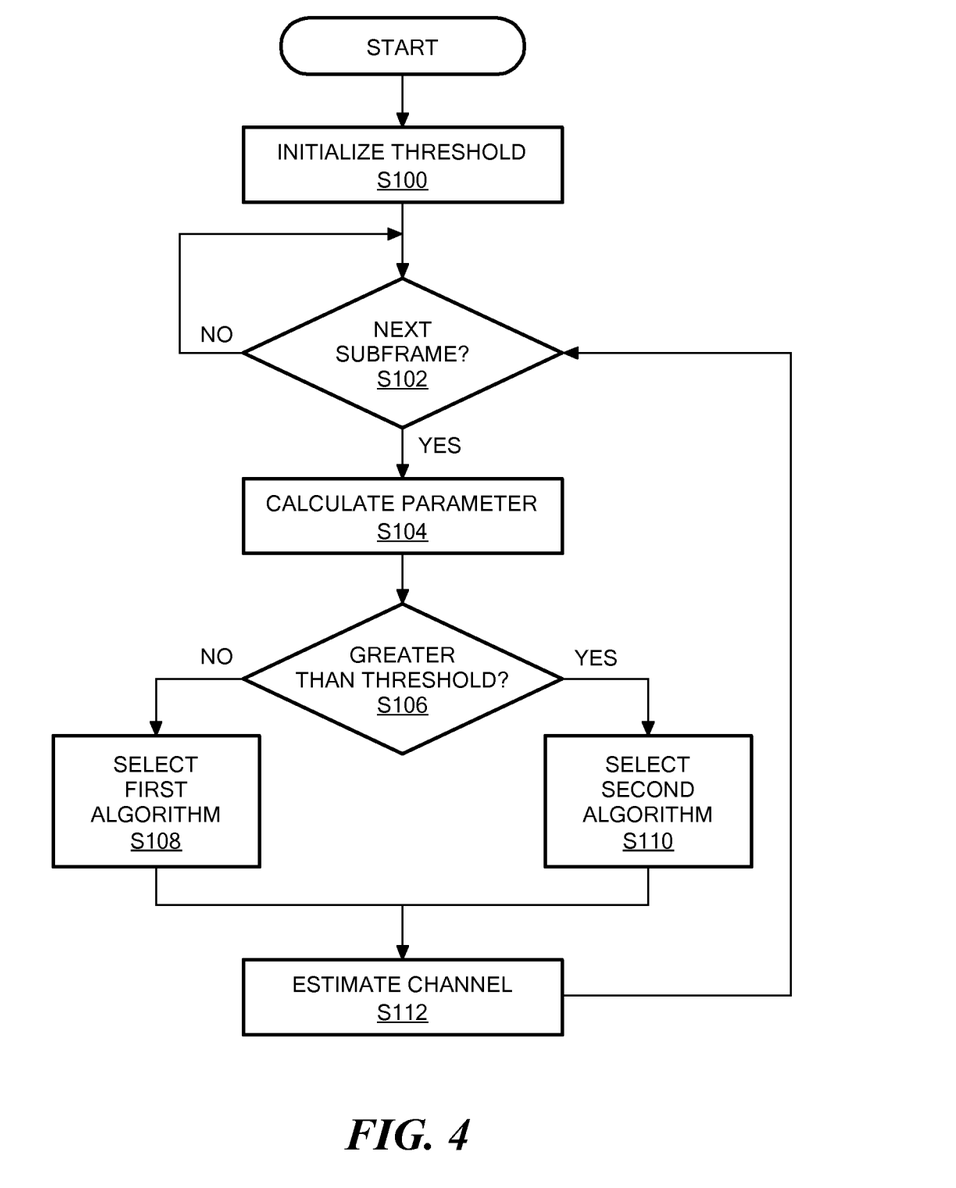
FIG. 4 is a flow chart of an exemplary process for selecting a channel estimation algorithm in accordance with the principles of the present invention.

FIG. 4 is a flow chart of an exemplary process for selecting a channel estimation algorithm. Initially, a threshold is computed (step S100). Then, for every sub frame (step S102), a parameter indicative of an accuracy of a channel estimation algorithm is calculated, (step 104). This may be the statistical parameter $\theta_n$ described above or the mean square error described above. The parameter is then compared to a threshold, (step S106). This may be the threshold Θ described above. If the parameter exceeds the threshold, a first channel estimation algorithm may be selected (step S108). If the parameter does not exceed the threshold, a second channel estimation algorithm may be selected (step S110). In one embodiment, the first channel estimation algorithm is a linear interpolation algorithm and the second channel estimation algorithm is an averaging algorithm. Once the channel estimation algorithm is selected, the channel is estimated (step S112).

Figure 5:
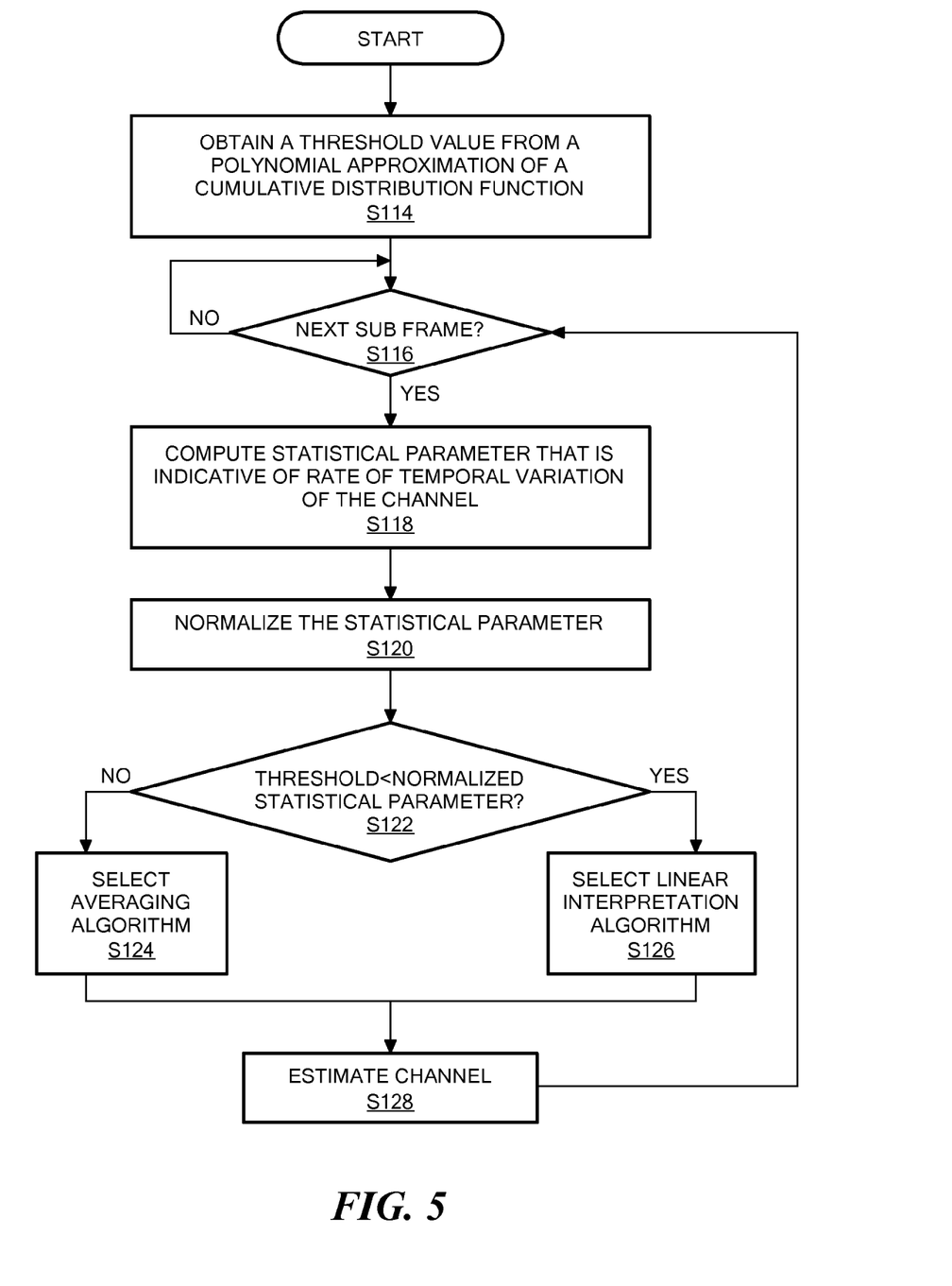
FIG. 5 is a flow chart of an alternative exemplary process for selecting a channel estimation algorithm based on a measure of a temporal variation of the channel in accordance with the principles of the present invention.

FIG. 5 is a flow chart of an exemplary process for selecting a channel estimation algorithm based on a measure of a temporal variation of the channel. Initially, a threshold value is obtained from a cumulative distribution function (CDF) or an approximation of a CDF, such as a polynomial approximation of a CDF (step S114). The particular CDF may be based on a selected Doppler frequency and a selected SNR. At each sub frame (step S116), a statistical parameter that is indicative of a temporal variation of the channel based on channel estimates that are based on the known pilot symbols is calculated (step S118). The computed statistical parameter is normalized by, for example, the received power (step S120). The normalized statistical parameter is compared to the threshold (step S122). If the normalized statistical parameter is less than the threshold, an averaging algorithm is selected (step S124). If the normalized statistical parameter is greater than the threshold, a linear interpretation algorithm is selected (step S126). The channel is then estimated using the selected channel estimation algorithm (step S128).

Figure 6:
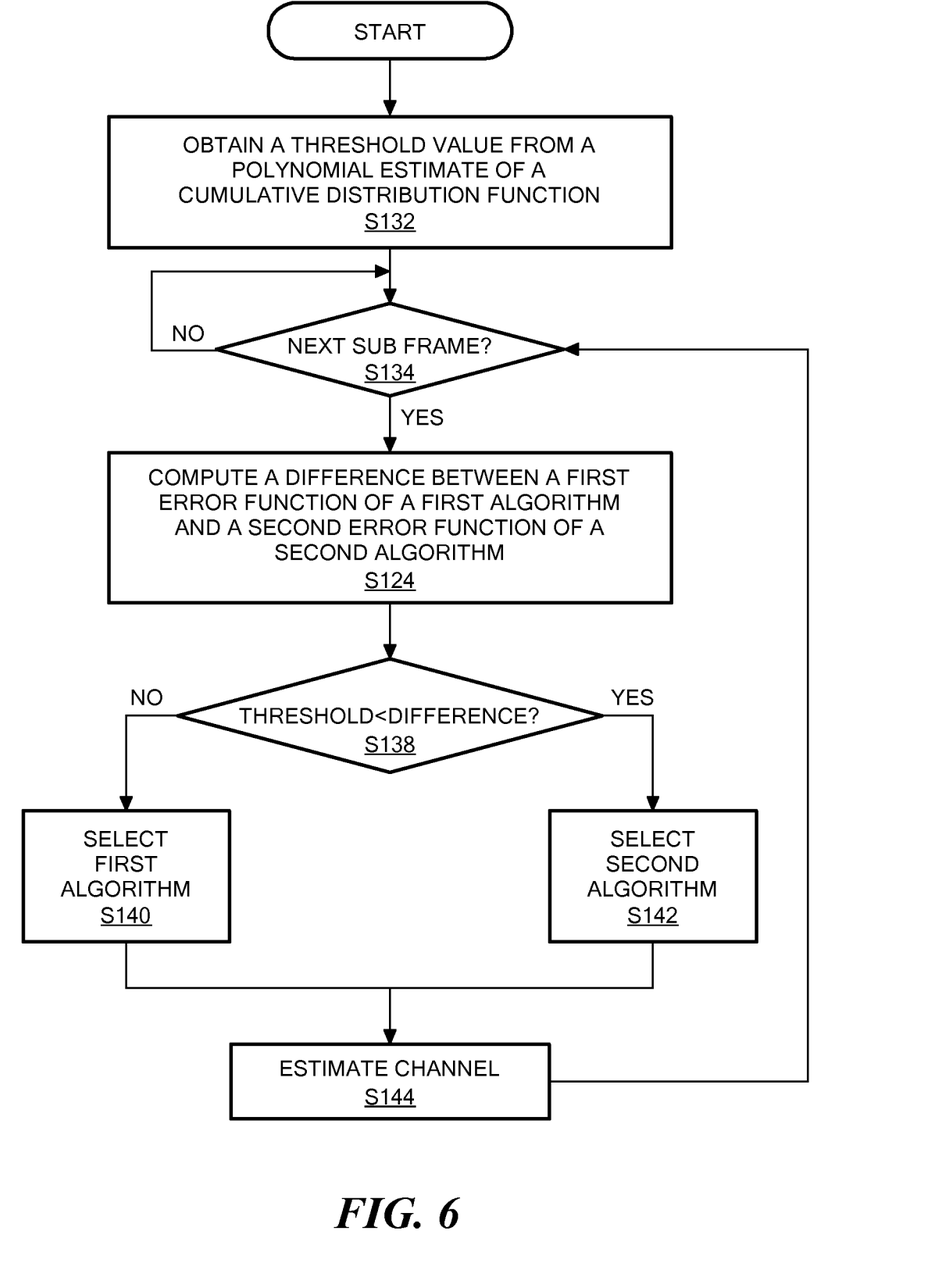
FIG. 6 is a flow chart of an exemplary process for selecting a channel estimation algorithm based on a computed mean square error in accordance with the principles of the present invention.

FIG. 6 is a flow chart of an exemplary process for selecting a channel estimation algorithm based on a computed mean square error. Initially, a threshold value is obtained from a cumulative distribution function (CDF) or an approximation of a CDF, such as a polynomial approximation of a CDF (step S132) At each sub frame (step S134), a difference between a first error function of a first channel estimation algorithm and a second error function of a second channel estimation algorithm is computed (step S136). The particular CDF may be based on a selected Doppler frequency and a selected SNR. The computed difference between the first and second error functions is compared to a threshold (step S138). If the difference is less than the threshold, the first algorithm is selected (step S140), and if the difference is greater than the threshold, the second algorithm is selected (step S142). The channel is estimated using the selected channel estimation algorithm (step S144).

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a router, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Thus, one embodiment is a computer readable medium containing computer readable instruction that, when executed by a processor, cause the processor to perform functions for selecting a channel estimation algorithm. The functions include calculating a parameter indicative of an accuracy of a channel estimation algorithm for estimating a channel in a communication system. The functions further include selecting a channel estimation algorithm to estimate a channel based on the parameter. In one embodiment, the parameter is based on a first error associated with a first algorithm and a second error associated with a second algorithm. The first and second errors may be mean square errors. The first algorithm may be an averaging algorithm and the second algorithm may be a linear interpolation algorithm. In other embodiments, the parameter may be based at least in part on a temporal variation of the channel. The parameter also may be based at least in part on a measure of the estimated received signal to noise ratio after channel estimation.

Thus, the switching algorithm described herein is a low complexity algorithm exhibiting performance comparable to a minimum means square error (MMSE) algorithm, but has the advantage of not requiring knowledge of a Doppler frequency. The switching algorithm exhibits robust performance in a wide range of channel conditions, including transmit and receive antenna correlation, a varying number of resource blocks, low and high Doppler frequencies, low and high delay spread and different levels of SINR.

In addition, unless mention was made above to the contrary, it should be noted that all of the accompanying drawings are not to scale. It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of selecting an algorithm for channel estimation in a communication system, the method comprising:
calculating a parameter indicative of an accuracy of a channel estimation algorithm, the parameter being calculated based on a summation of square differences of channel estimates at different times normalized by an estimated received power, the estimate of the received power being determined after channel estimation, the summation being over a number of transmit antennas, a number of receive antennas, and a number of subcarriers; and
selecting between a first channel estimation algorithm and a second channel estimation algorithm based on the parameter.

2. The method of claim 1, wherein the parameter indicative of the accuracy of the channel estimation algorithm is a parameter indicative of an amount of a temporal variation in a channel estimate.

3. The method of claim 2, wherein the selecting includes:
comparing the parameter to a threshold; and
determining when the parameter indicates one of a low temporal variation and a high temporal variation.

4. The method of claim 3, wherein an averaging algorithm is selected if the parameter indicates a low temporal variation, and a linear interpolation algorithm is selected if the parameter indicates a high temporal variation.

5. The method of claim 3, wherein the threshold is based at least in part on a probability distribution of the parameter.

6. The method of claim 1, wherein the parameter is based on an error function.

7. The method of claim 6, wherein the parameter is based on a difference between an approximate mean square error of an averaging algorithm and an approximate mean square error of a linear interpolation algorithm.

8. A method of selecting an algorithm for channel estimation in a communication system, the method comprising:
calculating a parameter indicative of an amount of a temporal variation in a channel estimate, the parameter being calculated based on a summation of square differences of channel estimates at different times;
selecting between a first channel estimation algorithm and a second channel estimation algorithm based on the parameter; and
the selecting including:
comparing the parameter to a threshold, the threshold being based at least in part on a probability distribution of the parameter, the threshold being further based at least in part on a signal to noise ratio of a signal transmitted through the channel, the signal to noise ratio being measured after channel estimation; and
determining when the parameter indicates one of a low temporal variation and a high temporal variation.

9. A method of selecting an algorithm for channel estimation in a communication system, the method comprising:
calculating a parameter indicative of an accuracy of a channel estimation algorithm, the parameter being calculated based on a summation of square differences of channel estimates at different times, the parameter being indicative of an amount of a temporal variation in a channel estimate; and
selecting between a first channel estimation algorithm and a second channel estimation algorithm based on the parameter, the selecting including:
comparing the parameter to a threshold, the threshold being approximated by a polynomial function based on a probability distribution of the parameter; and
determining when the parameter indicates one of a low temporal variation and a high temporal variation, the threshold being approximated by $$\Theta(p) = \frac{\tilde{\Theta}(p)}{S\tilde{N}R_{lin}}$$

where $S\tilde{N}R_{lin}$ is an estimated received signal to noise ratio in linear scale after channel estimation, and $$\tilde{\Theta}(p) \approx -2.3339 p^4 + 8.0448 p^3 - 10.8173 p^2 + 6.8343 p - 0.7244$$

where $p \in [50,100]\%$ is a percentage point.

10. A method of selecting an algorithm for channel estimation in a communication system, the method comprising:
calculating a parameter indicative of an accuracy of a channel estimation algorithm, the parameter being calculated based on a summation of square differences of channel estimates at different times normalized by an estimated received power, the estimate of the received power being determined after channel estimation;
selecting between a first channel estimation algorithm and a second channel estimation algorithm based on the parameter, the parameter being given by:

$$\theta_n = \frac{\theta}{\tilde{P}_r}$$

and where $\tilde{P}_r$ is an estimated received power after channel estimation and the summation is given by one of $$\theta = \frac{1}{2 N_T N_R F} \sum_{j=1}^{N_T} \sum_{i=1}^{N_R} \sum_{f=1}^{F} \left( \text{Re}(\tilde{H}_f^{ij}(n_1)) - \text{Re}(\tilde{H}_f^{ij}(n_2)) \right)^2 + \left( \text{Im}(\tilde{H}_f^{ij}(n_1)) - \text{Im}(\tilde{H}_f^{ij}(n_2)) \right)^2$$

and a multiple thereof, and where $N_T$ is a quantity of transmit antennas, $N_R$ is a quantity of receive antennas, F is a number of subcarriers, and $\tilde{H}_f^{ij}(n_k)$ is an estimate of the channel frequency response between antennas i and j at a time $n_k$ of the $f^{th}$ subcarrier.

11. A method of selecting an algorithm for channel estimation in a communication system, the method comprising:
calculating a parameter indicative of an accuracy of a channel estimation algorithm, the parameter being calculated based on a summation of square differences of channel estimates at different times, the parameter being further based on a difference between an approximate mean square error of an averaging algorithm and an approximate mean square error of a linear interpolation algorithm, the difference being approximately given by $$MSE_\Delta = MSE_{avg} - MSE_{linear} \approx 8P(1 - J_0(7\omega_0)) - 8.28\sigma_z^2$$

where P is a transmit signal power, $J_o$ is a zero order Bessel function of the first kind, $\omega_o$ is $\omega_0 = 2\pi f_D T_s$, $f_D$ a Doppler frequency, $T_s$ is the OFDM symbol interval and $\sigma_z^2$ is an estimation of a noise variance of a channel, and where $J_0(7\omega_0)$ is obtained from $\theta = 2P(1 - J_0(7\omega_0)) + 2\sigma_z^2$; and selecting between a first channel estimation algorithm and a second channel estimation algorithm based on the parameter.

12. A non-transitory computer readable medium containing computer readable instruction that, when executed by a processor, cause the processor to perform functions that include:
   calculating a parameter indicative of an accuracy of a channel estimation algorithm for estimating a channel in a communication system, the parameter being calculated based on a summation of square differences of channel estimates at different times, the parameter being based at least in part on a temporal variation of the channel, the parameter being further based at least in part on a measure of an estimated received signal to noise ratio after channel estimation; and
   selecting a channel estimation algorithm to estimate a channel based on the parameter.

13. The non-transitory computer readable medium of claim 12, wherein the parameter is based on a first error associated with a first algorithm and a second error associated with a second algorithm.

14. The non-transitory computer readable medium of claim 13, wherein the first error and the second error are mean square errors, the first algorithm being an averaging algorithm and the second algorithm being a linear interpolation algorithm.

* * * * *

UNITED STATES PATENT AND TRADEMARK OFFICE
CERTIFICATE OF CORRECTION

| | | |
|---|---|---|
| PATENT NO. | : 9,071,473 B2 | Page 1 of 1 |
| APPLICATION NO. | : 13/229164 | |
| DATED | : June 30, 2015 | |
| INVENTOR(S) | : Yepez et al. | |

It is certified that error appears in the above-identified patent and that said Letters Patent is hereby corrected as shown below:

In The Specification

In Column 1, Line 42, delete "channels." and insert -- channels, --, therefor.

In Column 3, Line 67, delete "symbol$^n$," and insert -- symbol n, --, therefor.

In Column 4, Line 65, delete "channel" and insert -- after channel --, therefor.

In Column 6, Line 40, delete "$MSE_{lin}$," and insert -- $MSE_{linear}$, --, therefor.

Signed and Sealed this
Sixteenth Day of February, 2016

Michelle K. Lee
*Director of the United States Patent and Trademark Office*